Patented Apr. 18, 1933

1,904,447

UNITED STATES PATENT OFFICE

CARL HAMBUECHEN, OF BELLEVILLE, ILLINOIS, ASSIGNOR TO THE B-L ELECTRIC MANUFACTURING COMPANY, OF ST. LOUIS, MISSOURI, A CORPORATION OF MISSOURI

RECTIFIER

No Drawing.     Application filed January 2, 1931. Serial No. 506,313.

This invention relates to dry current rectifiers.

In the patent to Pawlowski No. 834,924 there is described and claimed a rectifier for alternating current consisting of plates or discs of electro positive metals and electro negative metals arranged in contact with each other. The asymmetric couples so formed depend for their action on the presence of a rectifying or bonding material between the electrode elements. Various methods for forming this rectifying or bonding material have been proposed. In the Ruben Patent No. 1,649,741 the electro positive element is coated with a sulphide (or hydroxide) by placing it in a bath of an alkaline sulphide and connecting it as the anode in a current path through the sulphide solution to a suitable cathode electrode such as brass and nickel.
In my copending application Serial No. 440,635 filed March 31, 1930 I have disclosed and claimed a dry current rectifier in which the electro negative electrode element is provided with a bonding surface of an inorganic salt of an electro positive metal which bonding surface is arranged in contact with the electro positive electrode element.

I have found that an efficient rectifier may be produced by arranging a plate or disc of an electro positive metal in contact with the surface of a sulphide of an electro negative metal having a surface layer of an iodide of an electro negative metal. In carrying out my invention I provide alternate discs or washers of aluminum or other electro positive metal. These discs are assembled with the discs of copper sulphide treated in the manner described above and a rectifying unit of any number of cells may be constructed in the usual manner by assembling the alternate discs on a bolt or other support between suitable end plates and suitable connecting plates in the usual manner. The copper sulphide washers are prepared by heating copper washers in the presence of sulphur to a temperature at which reaction between the two takes place and the copper washers are converted to copper sulphide. The washers employed in my rectifier are essentially cuprous sulphide. When copper and sulphur react in the method set forth above, the copper formed is a mixture of cuprous and cupric sulphide with possibly some free sulphur present, but I have found by analysis that there is a far greater proportion of cuprous present and that the washers are thus essentially cuprous sulphide. To form cupric sulphide or washers that are essentially cupric sulphide, it is necessary to use other methods than the mere heating of sulphur and copper in the presence of each other. Although I prefer to employ cuprous sulphide washers, I may also employ washers that are essentially cupric sulphide.

The surface of the copper sulphide washer which is to come in contact with the aluminum or other electro positive electrode element is moistened with a solution of iodine dissolved in alcohol. The iodine reacts with the copper sulphide to form a coating of copper iodide. The treated washers, each having a surface of copper iodide, are then assembled into a rectifying unit with the copper iodide surface in contact with the electro positive electrode elements and the assembly then tightened under a pressure of three hundred pounds. The unit is then submitted to an alternating current by means of which the rectifier is formed. A further pressure of three thousand pounds is then applied to it and the unit tightened under this pressure.

While a rectifier having the desired properties may be constructed by treating the copper sulphide elements with iodine in the manner described above, I have found that better results are obtained by the addition of magnesium oxide to the solution of iodine to be applied to the surface of the copper sulphide washers. Apparently some magnesium iodide is formed. When copper sulphide washers or discs are treated with this solution, copper iodide and some magnesium iodide is formed on the surface of the washers. The alcohol used as a solvent evaporates leaving the copper sulphide washer with a coated surface of copper iodide and magnesium iodide. The treated washers are then assembled with the electro positive electrode elements of aluminum or other electro positive metal, and a high pressure can be put on the rectifying unit producing a unit that is immediately operative without forming. While it is not entirely clear what reaction takes place, it is probable that some magnesium oxide is formed by decomposition of the magnesium iodide between the electro positive element and the copper sulphide element. After such rectifier has been in operation for some time the surfaces are welded together and when separated from each other, the aluminum presents a crystalline structure.

In another method of forming the electro negative electrode element, the copper washers are first sulphided in the manner set forth above. The coating is prepared by mixing equal parts of finely ground copper sulphide, and iodine, and forming a solution in alcohol. As an example, 10 grams of copper sulphide, finely ground, and 10 grams of iodine are dissolved in 50 cc. of alcohol. The iodine reacts with the copper sulphide to form copper iodide. The copper sulphide changes to a grayish compound. The surfaces of the copper sulphide washers are then painted with this mixture and the alcohol permitted to evaporate. The treated copper sulphide washers are then assembled with electro positive electrode elements, as described above, and produce a very efficient rectifier.

Instead of using an electro positive electrode element of aluminum, magnesium or other electro positive elements may be substituted therefor. Elements prepared in the manner outlined above may be used in any conventional rectifier construction and it is therefore believed unnecessary to illustrate or describe the rectifier in detail in this specification. The essential feature of the invention resides in the treatment of the copper sulphide electro negative elements with a solution of iodine, or a solution of iodine to which magnesium oxide has been added and the use of such treated electro negative elements in conjunction with electro positive elements of aluminum, magnesium or other electro positive metal with the electro positive electrode element in contact with the treated surface of the electro negative element.

In the claims the term "copper sulphide" is intended to mean either cuprous sulphide, cupric sulphide or a mixture of cuprous sulphide and cupric sulphide.

I claim:

1. A rectifying unit comprising an electro positive electrode element of aluminum, an electro negative electrode element of copper sulphide, and a layer of copper iodide between said elements.

2. A rectifying unit comprising an electro positive electrode element of a film forming metal, an electro negative electrode element of copper sulphide, and a layer of copper iodide between said elements.

3. The method of making dry current rectifiers which comprises applying a solution of iodine to the surface of a copper sulphide electro negative electrode elements and assembling said copper sulphide electro negative electrode elements with electro positive electrode elements with the treated surface of said copper sulphide electro negative electrode elements in contact with the electro positive electrode elements.

4. The method of making dry current rectifiers which comprises adding magnesium oxide to a solution of iodine, treating the surface of copper sulphide electro negative electrode elements with said solution, and assembling said treated copper sulphide electrode elements with electro positive electrode elements with the treated surface in contact with the electro positive electrode elements.

5. A rectifying unit comprising an electro positive electrode element of magnesium, an electro negative electrode element of copper sulphide, and a layer of copper iodide between said elements.

In testimony whereof I affix my signature.

CARL HAMBUECHEN.